Patented June 1, 1943

2,320,847

UNITED STATES PATENT OFFICE 2,320,847

Δ⁵-CHOLESTENONE-3 AND A METHOD FOR PRODUCING THE SAME

Adolf Butenandt, Berlin-Dahlem, Germany, assignor to Schering Corporation, Bloomfield, N. J., a corporation of New Jersey No Drawing. Original application March 25, 1937, Serial No. 132,954, now Patent No. 2,224,856, dated December 17, 1940. Divided and this application December 14, 1940, Serial No. 370,134. In Germany March 31, 1936

2 Claims. (Cl. 260—397.2)

This invention relates to β.γ-unsaturated ketones of the cyclopentano polyhydro phenanthrene series of the general formula $C_{19}H_{26}O(X)$ and the constitutional formula

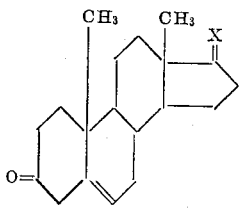

in which X indicates

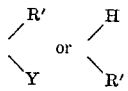

Y being a hydroxyl group or a group convertible by hydrolysis into the hydroxyl group, as, for example, an ester or ether group or the like R' hydrogen or a hydrocarbon radical, and R any suitable substituted or non-substituted hydrocarbon residue, and method of producing the same. The present application is a division of my application Serial No. 132,954, filed March 25, 1937. In particular the present invention is concerned with a process for the manufacture of β.γ-unsaturated ketones of the sterol and bile acid series and also of the pregnane series.

The process of manufacture according to the invention consists in subjecting β.γ-dihalogenated ketones of the cyclopentano polyhydro phenanthrene series of the general formula $$C_{19}H_{26}(Hlg)_2O(X)$$

and the constitutional formula

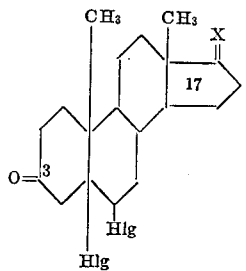

in which Hlg stands for halogen and X for =O,

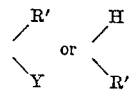

Y, R' and R having the same significance as above, to a dehalogenating treatment under mild conditions, for example, by means of zinc in a neutral medium.

Whereas in the case of the hitherto customary dehalogenation in acid or alkaline medium of β.γ-dihalogenated ketones with simultaneous isomerisation the corresponding α.β-unsaturated ketones are formed, in the case of the dehalogenation of the β.γ-dihalogenated ketones according to the present invention under mild conditions, for example, by means of zinc in a neutral medium, there is no displacement of the carbon-carbon double bond from the β.γ-position into the α.β-position; it is possible in this manner to produce hitherto unknown β.γ-unsaturated ketones of the cyclopentano polyhydro phenanthrene series.

As neutral medium for the dehalogenation of the β.γ-dihalogenated ketones usually carried out with zinc dust or the like, are suitable in particular alcoholic solvents such as methanol, ethanol and so on; there can obviously, however, also be employed other solvents reacting essentially neutral, as, for example, acetone or the like.

The β.γ-dihalogenated compounds of the cyclopentano polyhydro phenanthrene series containing keto groups coming into consideration as starting materials for the present process can be obtained in any suitable manner. They can, for example, be obtained by adding halogen to cyclopentano polyhydro phenanthrene compounds of the type initially mentioned, which contain on the carbon atom 3 a secondary alcohol group and in β.γ-position thereto, that is to say therefore between the carbon atoms 5 and 6, a double bond, and thereupon converting the dihalogenated secondary alcohols formed, by treatment with suitable oxidising agents, into the corresponding β.γ-dihalogenated ketones. Various of the β.γ-dihalogenated ketones serving for carrying out the process of the invention can be formed, for example, by a suitable degradation of such β.γ-dihalogenated ketones as possess on the carbon atom 17 a side chain capable of being degraded.

It is to be recommended likewise to employ as solvents for the recrystallisation of the β.γ-unsaturated ketones obtained according to the invention essentially neutrally reacting media.

The β.γ-unsaturated ketones of the cyclopentano polyhydro phenanthrene series obtainable according to the present process constitute valuable compounds; they can be further worked up to substances of great physiological activity and also to some extent themselves already possess a physiological activity.

The following examples serve to illustrate the invention without, however, limiting the same to them:

Example 1

100 mg. of $\Delta^5$-cholestanonedibromide-(5.6), as is obtainable, for example, by oxidation of cholesterol dibromide with chromic acid in glacial acetic acid, are heated in 3 cc. of ethanol with 100 mg. of analytically pure zinc dust for 15 minutes on the water bath. Thereupon the zinc is filtered off and the solution carefully sprayed with water. The separated $\Delta^5$-cholestenone-(3) indicates after several crystallisations a melting point of 127° C. with preliminary sintering. The yield amounts to about 70 mg.

In carrying out the dehalogenation, instead of in ethanol, in methanol or acetone it is to be recommended that the reaction solution be heated for a longer time, say for 30 to 60 minutes.

The oxime obtained by interaction of $\Delta^5$-cholestenone-(3) with hydroxylamine acetate in alcoholic solution crystallises from alcohol in the form of small needles which exhibit a melting point of 188° C. with decomposition.

Example 2

200 mg. of $\Delta^5$-pregnenol-(3)-one-(20) of melting point 190° C. are dissolved in 15 cc. of glacial acetic acid and treated drop by drop with a solution of 101 mg. of bromine in 5 cc. of glacial acetic acid corresponding to 2 atoms of halogen per molecule. To the solution which is soon decolorised is added in 7 cc. of glacial acetic acid the quantity of chromium trioxide corresponding to 3 atoms of available oxygen per mol. The reaction mixture is allowed to stand for 24 hours at room temperature and then treated with about 250 cc. of water. The precipitated product is dissolved in 10 ccs. of methanol and after the addition of 500 mg. of analytically pure zinc dust is heated to gentle boiling for 30 minutes. After the solution has been freed from zinc dust and somewhat concentrated, by the addition of a little water a well defined crystalline product of melting point 145° to 149° C. is obtained in a yield of 80 mg. By recrystallisation from dilute and pure methanol, from ethanol and finally from acetone the $\Delta^5$-pregnendione-(3.20) is obtained in well formed colorless leaflets of melting point 158° to 160° C., which are relatively difficultly soluble in methanol, ethanol and acetone but easily soluble in chloroform.

The dioxime obtainable from $\Delta^5$-pregnendione-(3.20) by heating for 1 hour with excess of hydroxylamine acetate in alcoholic solution exhibits after recrystallisation from pure and dilute alcohol a melting point of 203° to 205° C. with brown coloration; complete decomposition takes place at 207° C.

Of course, many changes and variations in the reaction conditions and the like may be made by those skilled in the art in accordance with the principles set forth herein and in the claims annexed hereto.

Thus, for instance, other mildly acting dehalogenating agents, besides zinc dust may be used, such as copper-zinc alloy, reduced iron containing copper, magnesium in ethereal solution and the like, and other inorganic or organic dehalogenating agents, capable of acting under neutral conditions, such as are described, for instance, in Houben-Weyl, 3rd edition, vol. 2, p. 363; Berichte der Deutschen Chemischen Gesellschaft, vol. 54, p. 610 (1921) 2 Annalen der Chemie, vol. 278, p. 108 (1893), and elsewhere.

What I claim is:

1. Process for the manufacture of $\Delta^5$-cholestenone-(3) comprising subjecting cholestanone-(3)-dibromide-(5.6) under neutral conditions to the action of a dehalogenating agent capable of splitting off the halogen atoms, whereby a double bond is introduced in the 5.6 position.

2. $\Delta^5$-cholestenone-(3).

ADOLF BUTENANDT.